(12) United States Patent
Boddakayala et al.

(10) Patent No.: US 11,772,500 B2
(45) Date of Patent: Oct. 3, 2023

(54) TRACTION BATTERY PACK THERMAL MANAGEMENT ASSEMBLY

(71) Applicant: Ford Global Technologies, LLC, Dearborn, MI (US)

(72) Inventors: Bhaskara Rao Boddakayala, Troy, MI (US); Thomas Edward Smith, Livonia, MI (US); Holly M. Whetstone, Royal Oak, MI (US); Mohammadreza Eftekhari, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 229 days.

(21) Appl. No.: 17/322,133

(22) Filed: May 17, 2021

(65) Prior Publication Data

US 2022/0363144 A1 Nov. 17, 2022

(51) Int. Cl.
| | |
|---|---|
| *B60L 50/64* | (2019.01) |
| *B60L 58/26* | (2019.01) |
| *F28D 15/02* | (2006.01) |
| *H01M 10/613* | (2014.01) |
| *H01M 10/625* | (2014.01) |
| *H01M 10/6552* | (2014.01) |
| *H01M 10/6567* | (2014.01) |

(52) U.S. Cl.
CPC ............... *B60L 50/64* (2019.02); *B60L 58/26* (2019.02); *F28D 15/0275* (2013.01); *H01M 10/613* (2015.04); *H01M 10/625* (2015.04); *H01M 10/6552* (2015.04); *H01M 10/6567* (2015.04); *H01M 2220/20* (2013.01)

(58) Field of Classification Search
CPC .... B60L 50/64; B60L 58/26; B60L 2240/545; F28D 15/0275; H01M 10/613; H01M 10/625; H01M 10/6552; H01M 10/6567; H01M 2220/20; Y02E 60/10
See application file for complete search history.

(56) References Cited

U.S. PATENT DOCUMENTS

| | | | | |
|---|---|---|---|---|
| 6,104,611 | A * | 8/2000 | Glover | F28D 15/0275 |
| | | | | 165/104.33 |
| 6,397,618 | B1 * | 6/2002 | Chu | F28D 15/0275 |
| | | | | 257/E23.088 |
| 8,574,734 | B2 * | 11/2013 | Eisenhour | H01M 10/625 |
| | | | | 429/61 |
| 10,471,841 | B2 * | 11/2019 | Choufany | B60L 58/26 |
| 2009/0169983 | A1 * | 7/2009 | Kumar | H01M 10/659 |
| | | | | 429/120 |

(Continued)

FOREIGN PATENT DOCUMENTS

| | | | | |
|---|---|---|---|---|
| CN | 104795610 A | * | 7/2015 | ........ H01M 10/0525 |
| CN | 106252787 A | * | 12/2016 | .......... H01M 10/613 |

(Continued)

*Primary Examiner* — Kaity V Chandler
(74) *Attorney, Agent, or Firm* — David B. Kelley; Carlson, Gaskey & Olds, P.C.

(57) ABSTRACT

A traction battery assembly includes a thermal exchange device of a battery pack, and battery arrays disposed adjacent the thermal exchange device. A phase change material is secured to an area of the thermal exchange device. A method of managing thermal energy within a battery pack includes, among other things, positioning battery arrays against a thermal exchange device, and securing a phase change material to the thermal exchange device. The phase change material is configured to take on thermal energy from at least one of the battery arrays.

20 Claims, 2 Drawing Sheets

(56) References Cited

U.S. PATENT DOCUMENTS

| | | | |
|---|---|---|---|
| 2012/0003516 A1* | 1/2012 | Eisenhour | H01M 10/625 |
| | | | 429/62 |
| 2012/0258337 A1* | 10/2012 | Wang | H01M 10/625 |
| | | | 429/50 |
| 2016/0118699 A1* | 4/2016 | Kim | H01M 10/6551 |
| | | | 257/713 |
| 2017/0028869 A1 | 2/2017 | Boddakayala et al. | |
| 2017/0346144 A1* | 11/2017 | Addanki | H01M 50/271 |
| 2018/0331338 A1* | 11/2018 | Roderus | H01M 50/204 |
| 2019/0202302 A1* | 7/2019 | Turik | B60L 53/18 |
| 2020/0058971 A1* | 2/2020 | Smith | H01M 10/647 |
| 2020/0067152 A1* | 2/2020 | Jeon | H01M 10/625 |
| 2020/0161728 A1 | 5/2020 | Wang | |
| 2021/0023908 A1* | 1/2021 | Bellino | B60L 50/51 |
| 2022/0123389 A1* | 4/2022 | Chopard | H01M 10/625 |

FOREIGN PATENT DOCUMENTS

| | | | | |
|---|---|---|---|---|
| CN | 206931685 U | * | 1/2018 | F28D 20/02 |
| CN | 108987641 A | * | 12/2018 | F28F 3/12 |
| CN | 208570855 U | * | 3/2019 | H01M 10/613 |
| CN | 209016236 U | * | 6/2019 | B60L 50/64 |
| CN | 209641783 U | * | 11/2019 | H01M 10/613 |
| CN | 111187597 A | * | 5/2020 | Y02E 60/10 |
| CN | 211150722 | | 7/2020 | |
| CN | 111834700 A | * | 10/2020 | B60L 50/64 |
| CN | 211829109 U | * | 10/2020 | A61C 3/16 |
| CN | 112186297 A | * | 1/2021 | H01M 10/613 |
| CN | 112542631 A | * | 3/2021 | B60L 58/24 |
| DE | 102010055600 A1 | * | 6/2012 | H01M 10/0525 |
| GB | 2289976 A | * | 12/1995 | F28D 20/02 |
| KR | 102112716 B1 | * | 5/2020 | H01M 10/613 |
| WO | WO-2009146876 A1 | * | 12/2009 | F28F 3/12 |
| WO | WO-2011117221 A1 | * | 9/2011 | H01G 11/82 |
| WO | WO-2011153362 A1 | * | 12/2011 | B60K 1/04 |
| WO | WO-2014040666 A1 | * | 3/2014 | H01M 10/049 |
| WO | WO-2015001266 A1 | * | 1/2015 | B60K 1/04 |
| WO | WO-2018187901 A1 | * | 10/2018 | H01M 10/443 |
| WO | WO-2020016138 A1 | * | 1/2020 | H01M 10/613 |
| WO | WO-2020023357 A1 | * | 1/2020 | B60L 50/64 |
| WO | WO-2020028931 A1 | * | 2/2020 | H01M 10/0422 |

* cited by examiner

TRACTION BATTERY PACK THERMAL MANAGEMENT ASSEMBLY

TECHNICAL FIELD

This disclosure relates generally to managing thermal energy and, more particularly, to reducing thermal energy transfer between battery arrays of a battery pack.

BACKGROUND

Electrified vehicles differ from conventional motor vehicles because electrified vehicles can be driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

SUMMARY

A traction battery assembly according to an exemplary aspect of the present disclosure includes, among other things, a thermal exchange device of a battery pack, and battery arrays disposed adjacent the thermal exchange device. A phase change material is secured to an area of the thermal exchange device.

In another exemplary embodiment of the foregoing assembly, the battery arrays include a first battery array adjacent a second battery array. The area is between the first and second battery arrays.

Another exemplary embodiment of any of the foregoing assemblies includes an adhesive that secures the phase change material to the thermal exchange device.

In another example of any of the foregoing assemblies, the adhesive comprises an endothermic filler material.

In another exemplary embodiment of any of the foregoing assemblies, the endothermic filler material is sodium silicate.

In another exemplary embodiment of any of the foregoing assemblies, the phase change material is sodium nitrite.

In another exemplary embodiment of any of the foregoing assemblies, the thermal exchange device includes liquid coolant channels that communicate a liquid coolant.

In another exemplary embodiment of any of the foregoing assemblies, the thermal exchange device includes a thermal barrier that separates a first region of the thermal exchange device from a second region of the thermal exchange device. The first region is adjacent a first one of the battery arrays. The second region is adjacent a second one of the battery arrays.

In another exemplary embodiment of any of the foregoing assemblies, the thermal barrier is an intumescent coating.

Another exemplary embodiment of any of the foregoing assemblies includes battery arrays disposed on a surface of the thermal exchange device. Each of the battery arrays is spaced a distance away from each other to provide a gap between adjacent battery arrays. The phase change material is secured to the surface of the thermal exchange device within the gap.

In another exemplary embodiment of any of the foregoing assemblies, the surface faces upwards when the battery pack is in the installed position.

In another exemplary embodiment of any of the foregoing assemblies, the surface is a first surface. The thermal exchange device includes an opposite second surface that faces downwardly away from the first surface. The phase change material is additionally secured to the second surface.

Another exemplary embodiment of any of the foregoing assemblies includes an enclosure that encloses the battery arrays and the thermal exchange device.

A method of managing thermal energy within a battery pack according to another exemplary aspect of the present disclosure includes, among other things, positioning battery arrays against a thermal exchange device, and securing a phase change material to the thermal exchange device. The phase change material is configured to take on thermal energy from at least one of the battery arrays.

Another exemplary embodiment of the foregoing method includes adhesively securing the phase change material to the thermal exchange device.

In another exemplary embodiment of any of the foregoing methods, an adhesive used to secure the phase change material includes an endothermic filler material.

In another exemplary embodiment of any of the foregoing methods, the phase change material is potassium nitrite.

In another exemplary embodiment of any of the foregoing methods, the battery arrays are placed against a surface of the thermal exchange device. The phase change material is secured to areas of the surface between adjacent ones of the battery arrays.

Another exemplary embodiment of any of the foregoing methods includes communicating a liquid coolant through channels of the thermal exchange device.

Another exemplary embodiment of any of the foregoing methods includes incorporating a thermal barrier into the thermal exchange device. The thermal barrier separates a first region of the thermal exchange device from a second region of the thermal exchange device. The first region is adjacent a first one of the battery arrays. The second region is adjacent a second one of the battery arrays.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to reducing thermal energy transfer between battery arrays of a battery pack, particularly during a high temperature event.

Figure 1:
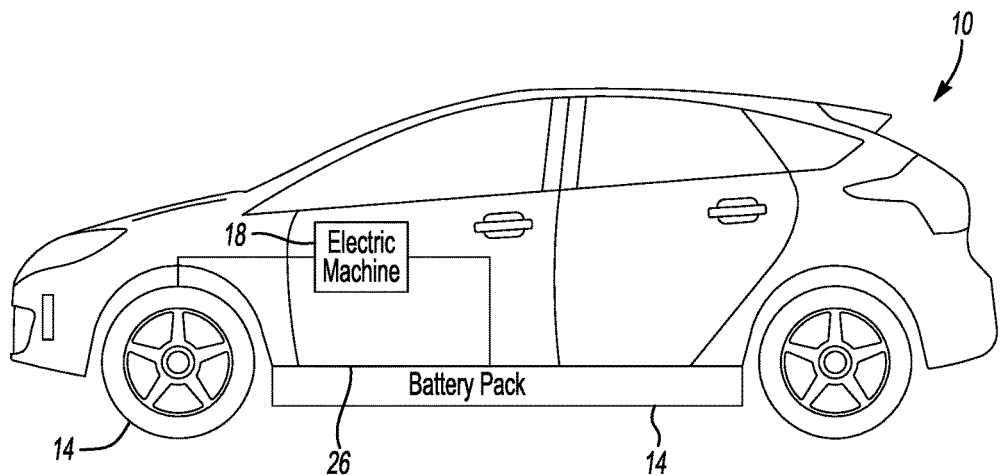
FIG. 1 illustrates a side view of an electrified vehicle according to an exemplary aspect of the present disclosure.

With reference to FIG. 1, an electrified vehicle 10, in an exemplary non-limiting embodiment, includes a traction battery pack 14 that powers an electric machine 18. The electrified vehicle 10 further includes wheels 22 driven by the electric machine 18. The battery pack 14 can power the electric machine 18, which converts electric power to torque to drive the wheels 22.

The battery pack 14 is, in the exemplary embodiment, secured to an underbody 26 of the electrified vehicle 10. The battery pack 14 could be located elsewhere on the electrified vehicle 10 in other examples. The battery pack 14 can be secured to the underbody 26 using straps and mechanical fasteners, for example.

The electrified vehicle 10 is an all-electric vehicle. In other examples, the electrified vehicle 10 is a hybrid electric vehicle, which can selectively drive wheels using torque provided by an internal combustion engine instead, or in addition to, an electric machine. Generally, the electrified vehicle 10 could be any type of vehicle having a traction battery pack.

Figure 2:
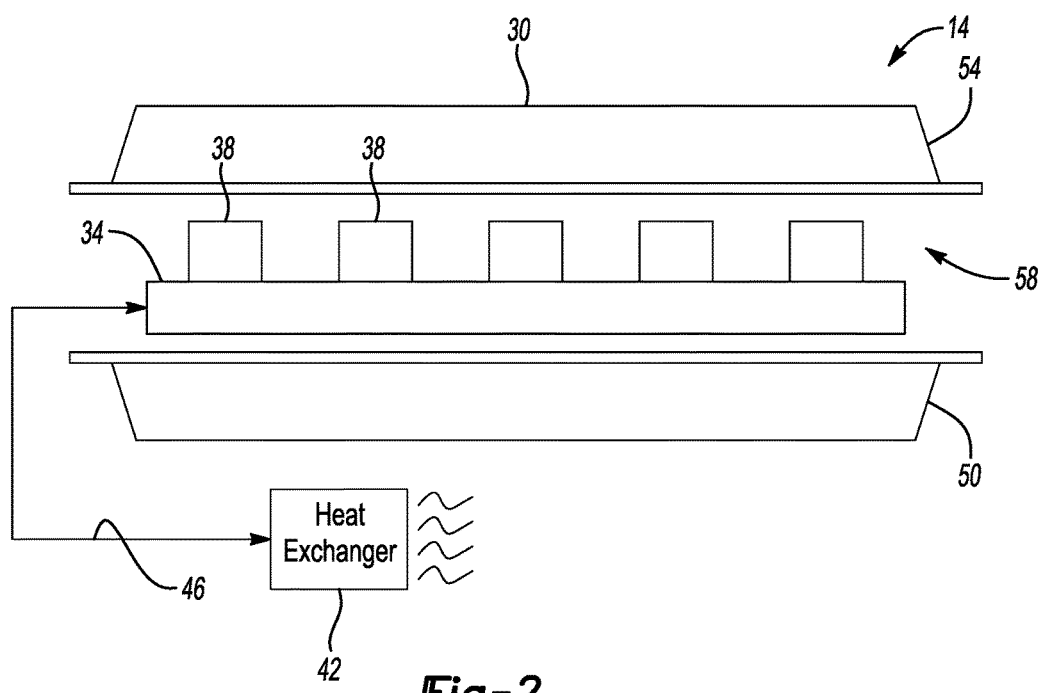
FIG. 2 illustrates an expanded view of a battery pack from the electrified vehicle of FIG. 2.

Referring now to FIG. 2 with continuing reference to FIG. 1, the example battery pack 14 includes an enclosure 30, a thermal exchange device 34, and a plurality of individual battery arrays 38.

The enclosure 30 can enclose the thermal exchange device 34 and the battery arrays 38 when the battery pack 14 is in an installed position on the vehicle 10. The thermal exchange device 34 is considered a cold plate in some example. The thermal exchange device 34 can be used to manage thermal energy levels of the battery arrays 38.

In this example, a heat exchanger 42 is outside the battery pack 14. A coolant path 46 circulates a liquid coolant between the thermal exchange device 34 and the heat exchanger 42. At the thermal exchange device 34, the coolant can take on thermal energy from the battery arrays 38. The coolant is then communicated back to the heat exchanger 42 where the thermal energy is transferred away from the coolant to air, for example.

The enclosure 30, in the exemplary embodiment, includes a tray 50 and a lid 54. The tray 50 and the lid 54 are secured to provide an interior area 58 that encloses the thermal exchange device 34 and the battery arrays 38. The tray 50 and the lid 54, or both, can be a polymer or polymer-based material.

In this example, each of the battery arrays 38 includes a plurality of individual battery cells held between array endplates. The battery cells within the battery arrays can heat up during operation.

Overcharge and over discharge of the battery cells can increase thermal energy levels and may lead to venting gasses from the battery cells. If one of the battery arrays 38 is experiencing such increased thermal energy levels, thermal energy from that battery array 38 can transfer to one of the other battery arrays 38 of the battery pack 14 causing the battery cells in that battery array 38 to vent.

The thermal exchange device 34 can be a metal or metal alloy. In this example, the thermal exchange device an aluminum material. The thermal exchange device 34 can provide a path for thermal energy to transfer from one of the battery arrays 38 to another of the battery arrays 38. Exemplary embodiments of this disclosure include features of the thermal exchange device 34 that can help to reduce an about of thermal energy transferred from one of the battery arrays 38 to a neighboring one of the battery arrays.

Figure 3:
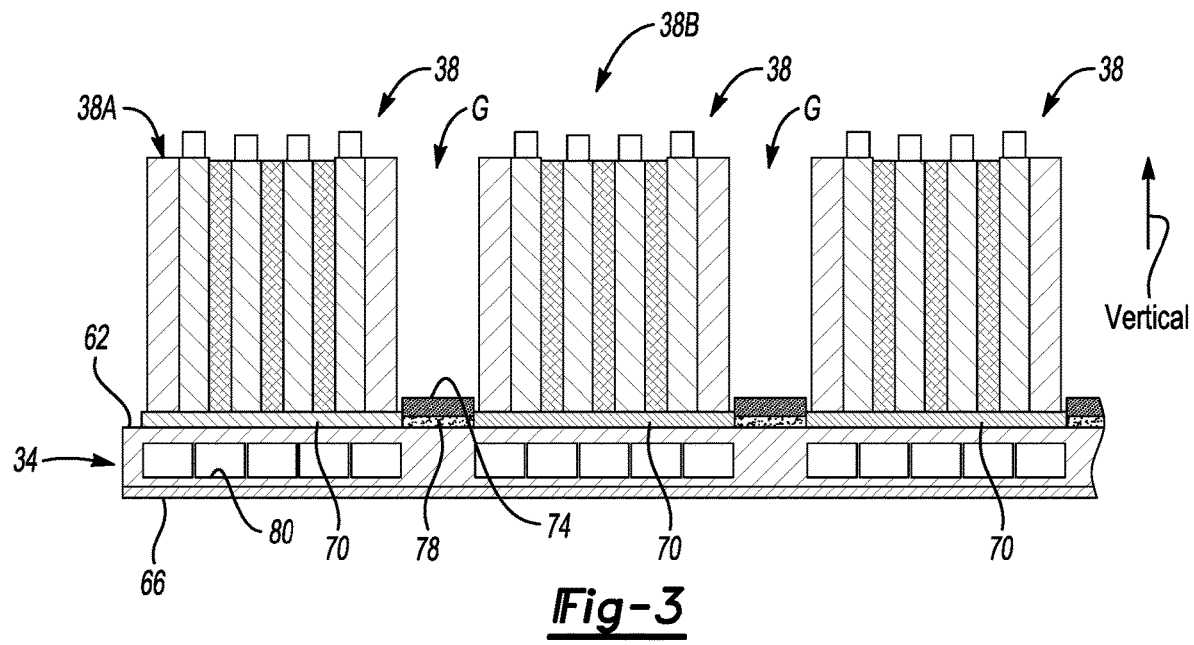
FIG. 3 illustrates a schematic side view of a portion of the battery pack in FIG. 2 according to a first embodiment of the present disclosure.

With reference to FIG. 3, the thermal exchange device 34 includes a first side 62 and a second side 66 that is opposite the first side 62. The first side 62 faces vertically upward in this example. Vertical, for purposes of this disclosure, is with reference to ground and an ordinary orientation of the vehicle 10 during operation.

The battery arrays 38 are disposed adjacent the thermal exchange device 34 upon the first side 62. A thermal interface material 70 is disposed between the battery arrays 38 and the base portion of the thermal exchange device 34.

The thermal interface material 70 helps to transfer thermal energy between the battery arrays 38 and coolant within the thermal exchange device 34. The battery arrays 38 are positioned on the thermal exchange device 34 such that there is an open area or gap G between directly adjacent battery arrays 38.

A phase change material 74 is secured to the thermal exchange device 34 within the gaps G. The phase change material 74 is thus secured to the thermal exchange device 34 between adjacent battery arrays 38.

In examples, the phase change material could be sodium nitrite ($NaNO_3$) or potassium nitrite ($KNO_3$). Sodium nitrate can have a phase change temperature of 306° C. Potassium nitrate can have a phase change temperature of 335° C. The phase change material 74 can be encapsulated in a high thermally conductive sheet layer.

In this example, an adhesive layer 78 secures the phase change material 74 (or the sheet layer in which the phase change material 74 is encapsulated) to the thermal exchange device 34. The adhesive layer 78 can comprise an endothermic filler material. In an example, the endothermic filler material is sodium silicate. For example, the adhesive layer 78 could include an epoxy holding dry sodium silicate or aluminum oxide particles. The endothermic filler material can facilitate thermal energy transfer from the thermal exchange device 34 to the phase change material 74.

If, for example, the battery array 38 experiences an increased level of thermal energy due to an overcharging condition, the thermal energy can move to the thermal exchange device 34 through the thermal interface material 70. Thermal energy then moves from the thermal exchange device 34 through the adhesive layer 78, and particularly the filler material of the adhesive 78, and into the phase change material 74. In response, the phase change material changes from a solid state to a liquid state. This takes on thermal energy and reduces thermal energy that is moved to the neighboring battery array 38.

In an example, the phase change material 74 includes water. Introducing sufficient levels of thermal energy changes the water from liquid to steam, which can then be released from the phase change material 74 into the atmosphere. Thermal energy released through the phase change material is thermal energy that will not pass from the thermal exchange device 34 into the battery array 38B, which is directly adjacent the battery array 34.

Some of the thermal energy from the battery array 38 also moves into coolant circulating through channels 80 of the thermal exchange device 34. The coolant can be liquid coolant that is then communicated back from the thermal exchange device 34 to the heat exchanger 42 via coolant path 46.

Figure 4:
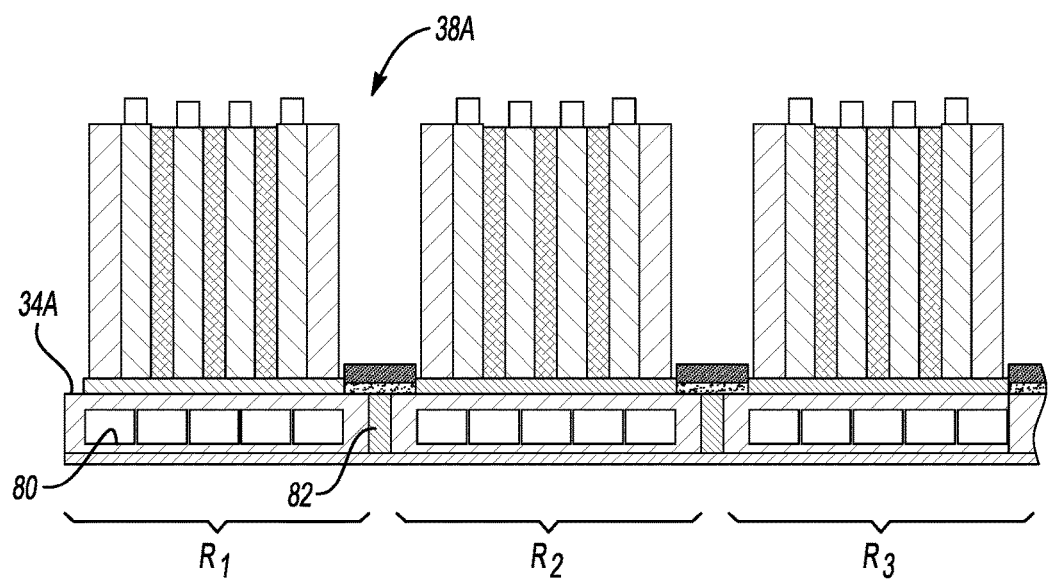
FIG. 4 illustrates the same side view in FIG. 3 of a portion of a battery pack according to another exemplary aspect of the present disclosure.

FIG. 4 shows another exemplary heat exchanger device 34A that includes thermal barriers 82 separating thermal exchange device 34A into various regions $R_1$, $R_2$, $R_3$. As needed, gaskets can be used to seal the interfaces between the regions $R_1$, $R_2$, $R_3$.

The thermal barriers 82 can prevent thermal energy within a region $R_1$ from moving into a region $R_2$, for example. Region $R_1$ is directly adjacent the battery array 38A and can have its thermal energy level increase when the battery array 34A increases due to an overcharging event, for example. Thermal energy within the region $R_1$ can then move into coolant circulated within channels 80 of the thermal exchange device 34. The thermal energy within the region $R_1$ is also directed into the phase change material 74 adjacent the region $R_1$. The thermal barrier 82 helps to block thermal energy from the region $R_1$ from moving into the region $R_2$.

In an example, the thermal barrier 82 is an intumescent coating with basalt or glass cloth. The thermal barrier 82 can be adhesively bonded to partition walls of coolant channels 80. The adhesive used to bond the thermal barriers 82 can be a flame-retardant structural adhesive (e.g., flame-retardant low viscosity epoxy) or an inorganic adhesive (e.g., silicon filled with intumescent).

The battery arrays 38 are shown on the first side 62, which is an upwardly facing surface in this example. In another example, the thermal exchange device 34 and battery arrays 38 could be positioned such that the battery arrays 38 are not residing on an upwardly facing surface of the thermal exchange device 34.

An exemplary method of managing thermal energy within the battery pack of FIGS. 3 and 4 can include positioning the battery arrays 38 upon and against the thermal exchange device 34, 34A. The method further includes securing the phase change material 74 to the thermal exchange device 34, 34A. The phase change material 74 can take on thermal energy from the thermal exchange device 34 or 34A.

Features of the disclosed examples can include incorporating a phase change material into a battery pack. The phase change material can provide a path for thermal energy to transfer away from a thermal exchange device rather than transferring to a battery array within the battery pack.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A traction battery assembly, comprising:
   a thermal exchange device of a battery pack;
   a plurality of battery arrays disposed on a surface of thermal exchange device, each of the battery arrays spaced a distance away from each other to provide a gap between adjacent battery arrays; and
   a phase change material that is secured to the same surface of the thermal exchange device, the phase change material disposed within the gap.

2. The traction battery assembly of claim 1, further comprising an adhesive that secures the phase change material to the thermal exchange device.

3. The traction battery assembly of claim 2, wherein the adhesive comprises an endothermic filler material.

4. The traction battery assembly of claim 3, wherein the endothermic filler material is sodium silicate.

5. The traction battery assembly of claim 1, wherein the phase change material is sodium nitrite.

6. The traction battery assembly of claim 1, wherein the thermal exchange device includes a plurality of coolant channels that communicate a liquid coolant.

7. The traction battery assembly of claim 1, wherein the thermal exchange device includes at least one thermal barrier that separates a first region of the thermal exchange device from a second region of the thermal exchange device, the first region adjacent a first one of the plurality of battery arrays, the second region adjacent a second one of the plurality of battery arrays.

8. The traction battery assembly of claim 7, wherein the at least one thermal barrier is intumescent coating.

9. The traction battery assembly of claim 1, a plurality of battery arrays disposed on a surface of the thermal exchange device, each of the battery arrays spaced a distance away from each other to provide a gap between adjacent battery arrays, wherein the phase change material is secured to the surface of the thermal exchange device within the gap, wherein the surface is a first surface, wherein the thermal exchange device includes an opposite, second surface that faces downwardly away from the first surface, wherein the phase change material is additionally secured to the second surface.

10. The traction battery assembly of claim 1, further comprising an enclosure that encloses the plurality of battery arrays and the thermal exchange device.

11. The traction battery assembly of claim 1, wherein the phase change material is spaced from the plurality of battery arrays.

12. The traction battery assembly of claim 1, wherein the surface faces upwards when the battery pack is in an installed position.

13. A traction battery assembly, comprising:
    a thermal exchange device of a battery pack;
    a plurality of battery arrays disposed adjacent the thermal exchange device; and
    a phase change material that is secured to an area of the thermal exchange device, wherein the plurality of battery arrays are disposed on a surface of the thermal exchange device, each of the battery arrays within the plurality of battery arrays is spaced a distance away from each other to provide a gap between adjacent battery arrays, wherein the phase change material is secured to the surface of the thermal exchange device within the gap, wherein the surface faces upwards when the battery pack is in an installed position.

14. A method of managing thermal energy within a battery pack, comprising:
    positioning a plurality of battery arrays against a surface of a thermal exchange device; and
    securing a phase change material to the same surface of the thermal exchange device, the phase change material configured to take on thermal energy from at least one of the plurality of battery arrays.

15. The method of claim 14, further comprising adhesively securing the phase change material to the thermal exchange device.

16. The method of claim 14, wherein an adhesive used to secure the phase change material includes endothermic filler material.

17. The method of claim 14, wherein the plurality of battery arrays are placed against a surface of the thermal exchange device, wherein the phase change material is secured to areas of the surface between adjacent ones of the plurality of battery arrays.

18. The method of claim 14, further comprising communicating a liquid coolant through channels of the thermal exchange device.

19. The method of claim 18, further comprising incorporating a thermal barrier into the thermal exchange device, the thermal barrier separating a first region of the thermal exchange device from a second region of the thermal exchange device, the first region adjacent a first one of the plurality of battery arrays, the second region adjacent a second one of the plurality of battery arrays.

20. The method of claim 14, wherein the surface faces upwards when the battery pack is in an installed position.

* * * * *